April 25, 1950      E. E. MARTIN      2,505,418
HOSE REELING MECHANISM
Filed March 26, 1948      2 Sheets-Sheet 1
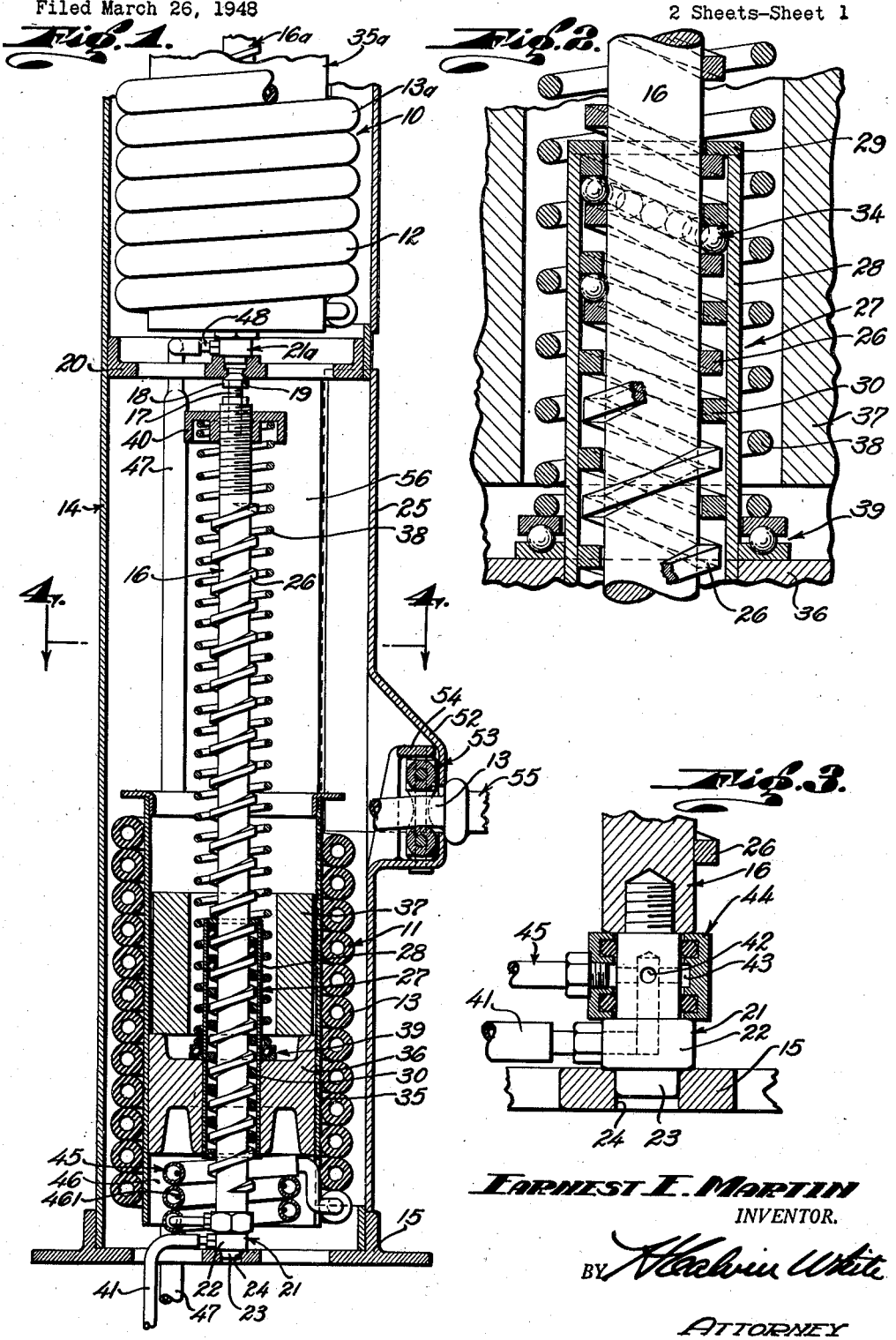
Earnest E. Martin
INVENTOR.
ATTORNEY April 25, 1950        E. E. MARTIN        2,505,418
HOSE REELING MECHANISM
Filed March 26, 1948        2 Sheets-Sheet 2
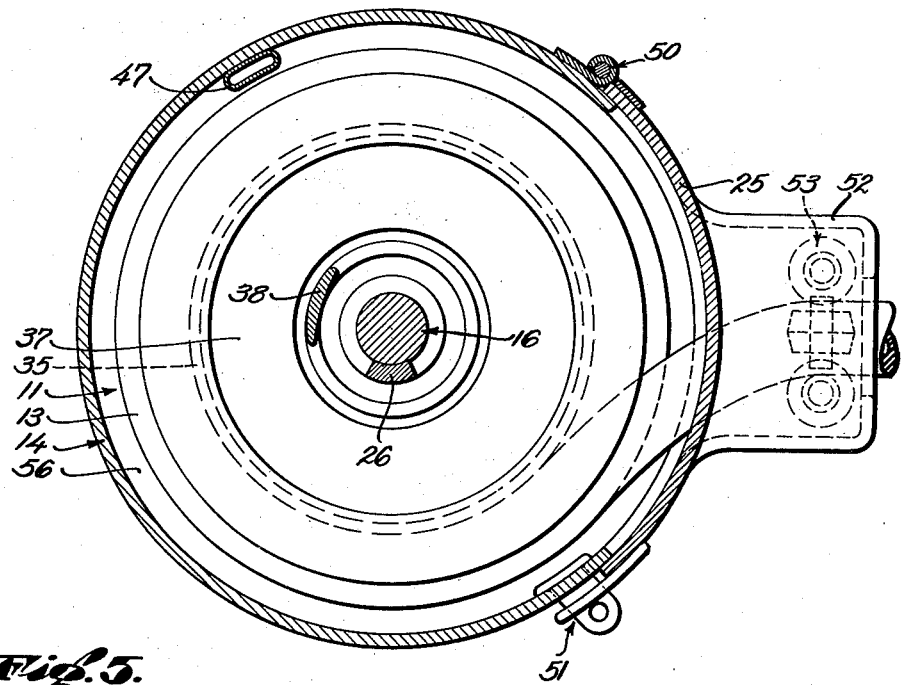
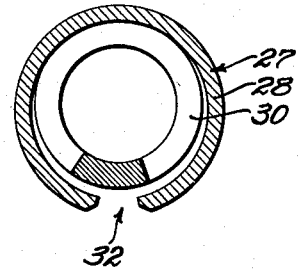
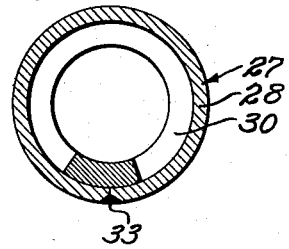
EARNEST E. MARTIN
INVENTOR.
BY *H. Calvin White*
ATTORNEY Patented Apr. 25, 1950

2,505,418

UNITED STATES PATENT OFFICE 2,505,418

HOSE REELING MECHANISM

Earnest E. Martin, Pasadena, Calif., assignor, by mesne assignments, to John Wood Manufacturing Company, Inc., New York, N. Y., a corporation of Delaware Application March 26, 1948, Serial No. 17,302

12 Claims. (Cl. 242—86)

This invention has to do generally with reeling mechanisms, especially of a type particularly adaptable for use in automatic take-up water and air hose reels for service stations. In general, the invention is directed to improvements in the types of apparatus disclosed in my copending application Serial No. 786,418, filed November 17, 1947, now Patent No. 2,478,494 of August 9, 1949, on Reeling mechanisms.

The present type of reeling mechanism contemplates the mounting of the winding drum for axial "floating" movement, in the sense that the drum is both rotatable and axially movable in response to force applied to the drum longitudinally or axially thereof. For present purposes, it is intended that the drum may be contained within a vertical housing and so operated that the hose will be pulled from the drum and returned thereto, at a substantially fixed vertical location.

One of my major objects is to render the drum upwardly displaceable by pulling and unwinding the hose, and to cause the drum to return downwardly in its winding travel, by the application of force, including the gravity force of a weight mass, so applied as to render the drum quickly responsive to release of the hose. Specifically the invention contemplates weighting the drum to supply a predetermined downward force and supplementing such force with a yielding pressure or force giving the drum prompt and effective take-up response throughout the extent of its travel.

Preferably the drum is movable in accordance with the travel of a nut element along a vertical screw shaft, the thread pitch of which is such that the nut and drum are displaceable along the shaft in response to endwise or axial force. As will appear, a particularly compact arrangement is provided by accommodating the weight mass within the drum, and supplementing the weight force by a coil spring encircling the shaft and bearing against the nut.

Additional objects of the invention have to do with such features as the screw and nut structures, and the mounting of the screw and drum assembly for simple installation in and removal from the housing. All the objects will be most clearly understood from the following detailed description of the typical embodiment shown by the accompanying drawing, in which:

Fig. 1 is a view showing the lower portion of a dual service station hose reeling unit in vertical section;

Fig. 2 is a fragmentary enlarged section illustrating particularly the screw shaft, nut and associated spring parts;

Fig. 3 is a fragmentary enlarged section showing the swivel connection at the base of the screw shaft;

Fig. 4 is an enlarged cross section of line 4—4 of Fig. 1; and

Figs. 5 and 6 are cross sectional views illustrating the method of forming the traveling nut part.

Referring first to the general view of Fig. 1, the apparatus appears typically to comprise upper and lower units 10 and 11, accommodating hoses 12 and 13 for dispensing water and air. Both units may be contained within a single vertical tubular housing 14 received at its lower end within the flange base 15. Since both units 10 and 11 have the same construction and operation, a description of the completely illustrated lower unit will suffice for an understanding of both.

The housing contains an axially alined screw shaft 16 carrying at its upper end a threaded stud 17 which may be turned to bring its head 18 into shaft-retained engagement within a central opening 19 in the transverse partition member 20. The lower end of the shaft carries a fitting 21 the head 22 of which has a non-circular projection 23 received within a correspondingly shaped opening 24 in the base plate 15. Thus the shaft is held against rotational and axial movement. As will later appear, upon opening the housing door 25, the shaft and all parts carried thereby may be removed from the housing by releasing the stud 17 from member 20 sufficiently to permit the shaft-carried assembly to be rocked outwardly and lifted out of the base opening 24, for removal through the door opening.

Although in the broad contemplation of the invention, the screw shaft may have any appropriate form of construction capable of permitting axial movement of the nut and drum in response to endwise pressure, it is found advantageous, particularly in view of cost considerations, to build the screw from rod or shaft stock to which a spirally wound thread is applied. Thus the thread 26 is shown to be formed of substantially square cross section rod or wire stock spirally wound about and secured to the body of the shaft.

The screw shaft, is traveled by a nut assembly, generally indicated at 27, comprising a tube 28 closed at its upper end by ring 29 and carrying on its interior surface screw thread 30 corresponding in pitch to the shaft thread 26. As illustrated in Figs. 5 and 6, the nut may be fabricated in a manner obviating the relatively great expense of having to drill and internally machine threads in a single piece or block of nut stock. In accordance with the invention, a spirally formed thread stock 30, similar to the screw shaft thread 26, is placed within a tube 28 and suitably retained therein. The axial load is transmitted from the nut threads to the screw threads by way of ball bearings 34 contained within the interthread space which is of sufficient extent in relation to the length of the nut travel longitudinally of the shaft 16 to enable the ball bearings to be accommodated at all times within progressive locations in the nut and without the balls all becoming displaced to either end of the nut.

The described nut assembly may in effect be integrated with the cylindrical winding drum 35 by way of a weight mass 36 of lead or other heavy material which may be solidified against or otherwise fixed to the lower extents of the tube 28 and winding drum. The weight of the mass 36 may be supplemented by one or more weights 37 inserted within the drum about the shaft and nut parts. The pitch of the shaft and nut threads is made sufficiently great that the combined weights of the masses 36 and 37, say in the order of ten pounds, will cause the nut and drum assembly to travel downwardly about the shaft 16 from any elevated position.

It is found that the inertia of the drum and nut assembly may produce a lag or delay in starting its movement down along the shaft from an initially stationary condition. As previously mentioned, one of my primary objects is to supplement the weight force, by a second force which will tend to overcome such starting inertia to the extent of giving the drum a relatively quick take-up start. For this purpose I employ a coil spring 38 placed about the shaft 16 and tube 28, the lower end of the spring being supported against a ball thrust bearing 39, see Fig. 2, and the upper end being confined within a nut 40 threaded on the shaft 16 and adjustable longitudinally thereof to vary the spring compression and to have its effective thrust against the drum.

Air or water is supplied to the hose 13 from line 41 attached to fitting 21, the fluid being discharged through passages 42 into a channel 43 in the packed swivel sleeve 44, from which the fluid is conducted to the hose 13 by way of an axially distensible tube or hose connection 45, the turns of which are accommodated when the parts are in the position of Fig. 1, within the bottom drum chamber 46. The turns 45 may contain a coil spring 46i having the function of maintaining and restoring the coil formation as the winding drum travels between its limited positions. Water or air is supplied to the upper unit 10 by way of pipe 47 which may extend upwardly within the housing to a connection at 48 with fitting 21a on the bottom of screw shaft 16a corresponding to the previously described fitting 21 and shaft 16.

The housing 14 is closed at one side opposite the unit 11 by door 25 hinged to the housing shell at 50 and secured at its free edge by an appropriate latch or holder 51 which may be locked to prevent access to the interior of the housing. The door shell is projected at 52 to form a housing for the hose guide roller assembly 53 retained within a support 54. As shown in Fig. 1 the hose 13 extends from the drum outwardly between the guide rollers for attachment to the usual air or water dispensing fitting 55 on the free end of the hose. At such times as the service station may be closed, the door 25 may be opened to permit accommodation of the hose end and fitting within the upper interior 56 of the housing, the door then being closed and locked.

In normal operation of the equipment, pulling of the hose 13 for air or water service at a location remote from the unit causes the drum 35 to travel upwardly on the screw shaft 16 a distance corresponding to the length of hose paid out, and against the resistance imposed by the weight masses 36 and 37, and the thrust of coil spring 38. Upon release of the hose, the spring acts to immediately start the drum in its downwardly rotating take-up travel, thus giving the drum quick response with continuous smooth winding action until the hose is fully returned to the drum. Since the weight and spring forces are effective throughout the full range of the drum travel, the drum will have the same quick take-up response for any length of hose paid out, and following any interruption of the hose after its take-up is once started.

I claim:

1. Reeling mechanism comprising a winding drum positioned for vertical axial movement, a mounting for the drum responsive to force applied downwardly thereto to impart rotational and axial movement to the drum, a weight mass exerting gravitational force on the drum, and means exerting on the drum a force supplementing said gravitational force.

2. Reeling mechanism comprising a winding drum positioned for vertical axial movement, a mounting for the drum responsive to force applied downwardly thereto to impart rotational and axial movement to the drum, a weight mass exerting gravitational force on the drum, and yielding means exerting against the drum throughout its range of vertical travel a downward thrust supplementing said gravitational force.

3. Reeling mechanism comprising a winding drum positioned for vertical axial movement, a mounting for the drum responsive to force applied downwardly thereto to impart rotational and axial movement to the drum, a weight mass exerting gravitational force on the drum, and a coil spring axially alined with the drum and exerting against the drum a downward force supplementing said gravitational force.

4. Reeling mechanism comprising a winding drum positioned for vertical axial movement, a mounting for the drum responsive to force applied downwardly thereto to impart rotational and axial movement to the drum, a weight mass contained within and exerting gravitational force on the drum, and means exerting on the drum a force supplementing said gravitational force.

5. Reeling mechanism comprising a winding drum positioned for vertical axial movement, a mounting for the drum responsive to force applied downwardly thereto to impart rotational and axial movement to the drum, a weight mass contained within and exerting gravitational force on the drum, and a spring extending within the drum and exerting against the drum a downward force supplementing said gravitational force.

6. Reeling mechanism comprising a hose winding drum positioned for vertical axial movement, a mounting for the drum responsive to force applied downwardly thereto to impart rotational and axial movement to the drum, a weight mass exerting gravitational force on the drum to rotate it downwardly in a hose winding direction, and yielding means exerting on the drum a force supplementing said gravitational force, said drum being upwardly rotatable against the resistance of said forces by pulling of the hose from the drum.

7. Reeling mechanism comprising a vertically positioned screw shaft, a nut traveling vertically on said shaft, a shaft-surrounding winding drum rotatable by and movable with the nut, a weight mass exerting gravitational force on the drum to cause it to rotate downwardly about said shaft, and means exerting on the drum a force supplementing said gravitational force.

8. Reeling mechanism comprising a vertically positioned screw shaft, a nut traveling vertically on said shaft, a shaft-surrounding winding drum rotatable by and movable with the nut, a weight mass exerting gravitational force on the drum to cause it to rotate downwardly about said shaft, a coil spring surrounding the shaft and exerting on the drum a force supplementing said gravitational force.

9. Reeling mechanism comprising a vertically positioned screw shaft, a nut traveling vertically on said shaft, a shaft-surrounding winding drum rotatable by and movable with the nut, a weight mass contained in the drum and exerting gravitational force on the drum to cause it to rotate downwardly about said shaft, a coil spring surrounding the shaft and exerting on the drum a force supplementing said gravitational force.

10. Reeling mechanism comprising a winding drum positioned for vertical axial movement, a mounting for the drum responsive to force applied downwardly thereto to impart rotational and axial movement to the drum, a weight mass exerting gravitational force on the drum, means exerting on the drum a force supplementing said gravitational force, and means for varying the magnitude of the last mentioned force.

11. Reeling mechanism comprising a vertically positioned screw shaft, a nut traveling vertically on said shaft, a shaft-surrounding winding drum rotatable by and movable with the nut, a weight mass exerting gravitational force on the drum to cause it to rotate downwardly about said shaft, a coil spring surrounding the shaft and exerting on the drum a force supplementing said gravitational force, and means for varying the force exerted by said spring.

12. Reeling mechanism comprising a vertically positioned screw shaft, a nut traveling vertically on said shaft, a shaft-surrounding winding drum rotatable by and movable with the nut, a weight mass contained within the drum and exerting a gravitational force causing the drum to rotate downwardly about said shaft, a coil spring surrounding the shaft above the drum and exerting on the drum a force supplementing said gravitational force, means carried by the shaft for varying the force exerted by the spring, a housing enclosing said shaft and drum, and means for removably mounting the shaft and drum assembly in the housing.

EARNEST E. MARTIN.

REFERENCES CITED

The following references are of record in the file of this patent:

UNITED STATES PATENTS

| Number | Name | Date |
|---|---|---|
| 1,683,911 | Morris | Sept. 11, 1928 |
| 2,166,054 | Holmes et al. | July 11, 1939 |